Oct. 9, 1928.

E. C. HEAD 1,686,523

MACHINE FOR PRODUCING GEARS

Filed June 3, 1926

INVENTOR
Ernest C. Head
BY
ATTORNEY

Oct. 9, 1928.  
E. C. HEAD  
1,686,523  
MACHINE FOR PRODUCING GEARS  
Filed June 3, 1926   3 Sheets-Sheet 2

INVENTOR  
Ernest C. Head  
BY  
ATTORNEY

Oct. 9, 1928.
E. C. HEAD
MACHINE FOR PRODUCING GEARS
Filed June 3, 1926
1,686,523
3 Sheets-Sheet 3
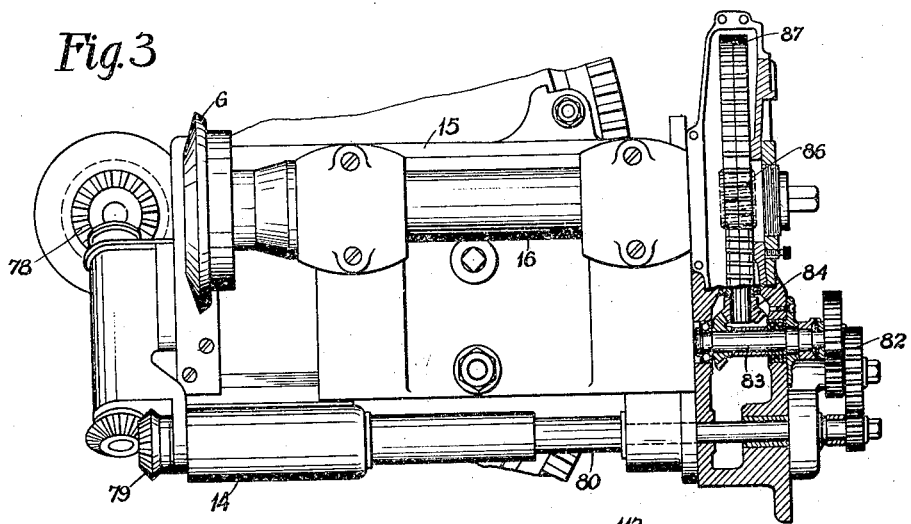
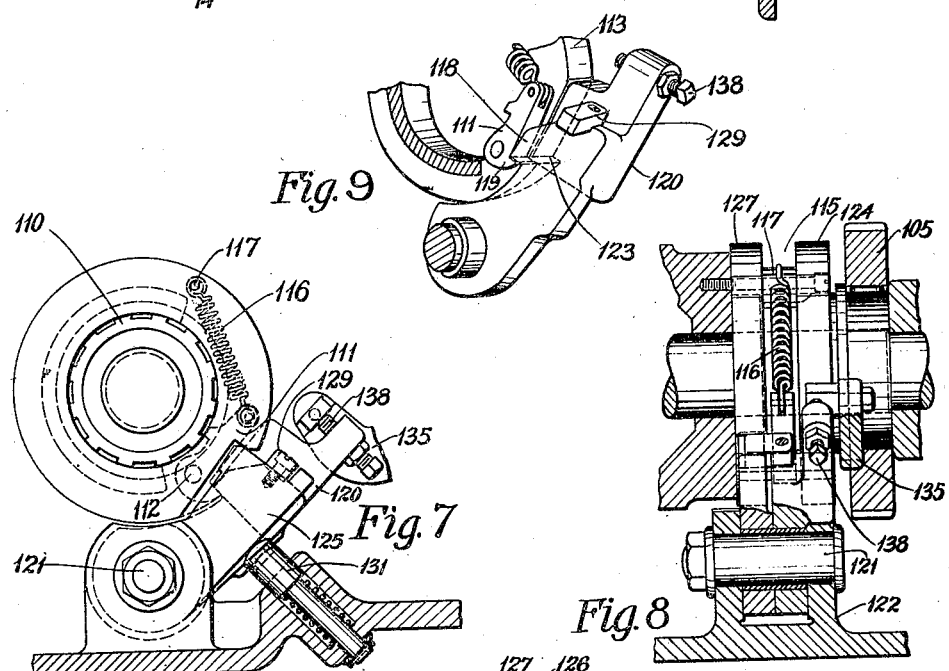
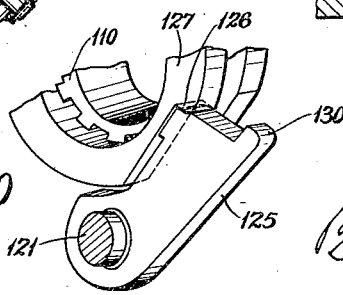
INVENTOR
Ernest C. Head
BY
ATTORNEY Patented Oct. 9, 1928.

1,686,523

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

MACHINE FOR PRODUCING GEARS.

Application filed June 3, 1926. Serial No. 113,532.

The present invention relates to machines for producing gears and in particular to machines for generating tapered gears. Specifically the present invention relates to gear generating machines employing an indexing mechanism of the universal type.

The present invention has for one object an improvement in the construction of gear generating machines of the type described whereby the tooth profiles may be generated with greater accuracy.

A further object of the invention is an improved arrangement in the gearing of gear generating machines of the type described whereby more accurate indexing, that is spacing from tooth to tooth may be achieved.

The present invention, as already stated, relates particularly to machines of the universal indexing type. In machines of this character, the blank is rotated on its axis by some form of gearing, usually a worm and worm wheel. During the cutting operation the rotation of the blank is in a predetermined relation to the movement of the cradle or carrier upon which either the tool or blank is mounted, so that the desired relative rolling or generating movement is achieved. Periodically, however, the tool and blank are withdrawn relatively to each other and in this period the blank is indexed usually by imparting to the blank an added rotation of an algebraic nature whereby the blank spindle rotation is accelerated or retarded relative to the movement of the cradle or carrier. In a machine of the character described, a set of change gears must be provided for governing the number of teeth to be produced on the blank. The universal indexing mechanism derives its name from the fact that gears having any desired number of teeth may be cut on any machine employing this type mechanism simply by changing one or more members of this set of index change gears in contradistinction to a notched plate indexing mechanism in which a different notched plate must be employed for each different number of teeth to be cut. In machines constructed according to the present invention, the index change gears are incorporated in the continuously moving train of gears which imparts to the blank its continuous rotation. With generating machines previously constructed, these gears were placed in the normally idle train of gears employed to periodically impart to the blank its indexing movement.

The new construction and arrangement of gearing has been found to have many marked advantages. One advantage is that by placing the index change gears in the continuously running train an additional reduction is provided so that all the gears interposed between this set of change gears and the main drive shaft can be speeded up, with the consequence that the influence of any errors in these gears upon the blank rotation is very considerably reduced and to all practical purposes eliminated. This feature of the present invention has the effect of not only reducing the possibility of errors in spacing but of improving the accuracy of tooth profile generation. A further advantage of the present invention is the entire elimination of any possible error in spacing due to backlash in the index change gears. These gears will now run continuously whereas heretofore they were started and stopped intermittently. The present invention has a still further advantage particularly applicable to the cutting of bevel gears in that the same set of ratio change gears, namely, the gears governing the ratio of blank rotation to cradle movement during cutting, may be employed in cutting both members of a pair. Heretofore it has been necessary to change not only the index change gears when cutting the different members of a bevel gear pair, but also to recalculate and change the ratio gears as well. This last advantage is, of course, a feature of any generating process in which the two members of a pair are cut each by a rolling movement on the same basic member.

In machines of the character described usually a differential is employed in the blank drive. One element of the differential is locked during cutting, being released when the tool and blank are out of engagement and actuated to impart to the blank the indexing movement. In the preferred embodiment of this invention means are provided for locking the differential up in the same place after each indexing cycle so that any errors which might be present in the gear train will be distributed equally to all the teeth and consequently will not affect the spacing of the teeth. The present invention, hence, provides means for producing gears in machines of the universal indexing type with greater accuracy than has heretofore been achievable.

A preferred embodiment of the invention is illustrated in the accompanying drawings, in which:

Figure 3 is a plan view of the work head of this machine;

Figure 5 is a section on the line 5—5 of Figure 1;

Figure 6 is a detail view partly in section of the differential lock control lever and the cam controlling same;

Figures 7 and 8 are an end elevation and a sectional view, respectively, of the differential locking mechanism; and Figures 9 and 10 are perspective views showing details of this mechanism.

Figure 1:
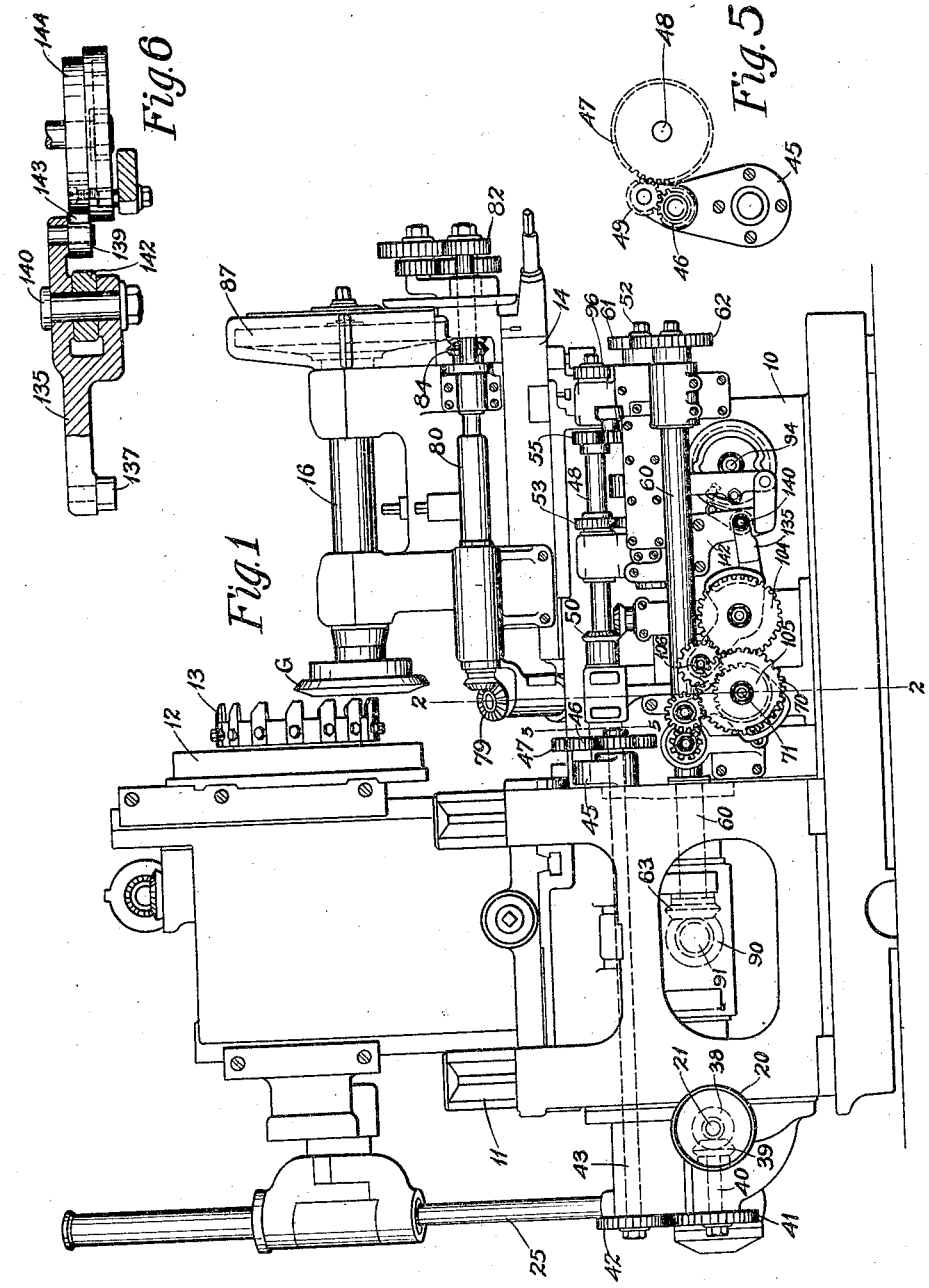
Figure 1 is a side elevation of a bevel gear generating machine constructed according to this invention.

The present invention is described hereinafter particularly with reference to a machine for producing bevel gears, but it will be understood that it is employable on any type of generating machine employing a universal type index and that the present application is intended to cover any uses, modifications, or adaptations of the invention which may fall within the scope of the invention or the limits of the appended claims.

Referring to the drawings by numerals of reference. 10 indicates the base of the machine upon which is oscillatably mounted a cradle 11 on which is supported the tool head 12 carrying in the embodiment of the invention shown a rotary annular face mill 13. Pivotally mounted on the base 10 is a work-head carrier 14 on which is adjustably mounted the work head 15 in which is journalled the blank spindle 16 to which is secured the gear blank G which is to be operated upon. Any usual or suitable means may be provided for adjusting the tool and blank relatively to each other to bring them into proper cutting relationship and need not here be particularly described. During the cutting operation the tool 13 is rotated on its axis in engagement with the blank G which is rotating on its axis and simultaneously the tool and blank are moved relatively to each other by the movement of the cradle 11 on its axis. The combined blank rotation and cradle movement constitutes the generating roll, the axis of the cradle representing the axis of the basic gear with which the blank is theoretically rolling. After a tooth side or where the gear is being cut "spread blade", two tooth sides have been completely generated, the tool and blank are withdrawn relatively to each other and the blank indexed, so that on re-engagement of the tool and blank the tool operates upon a different portion of the blank.

Figure 4:
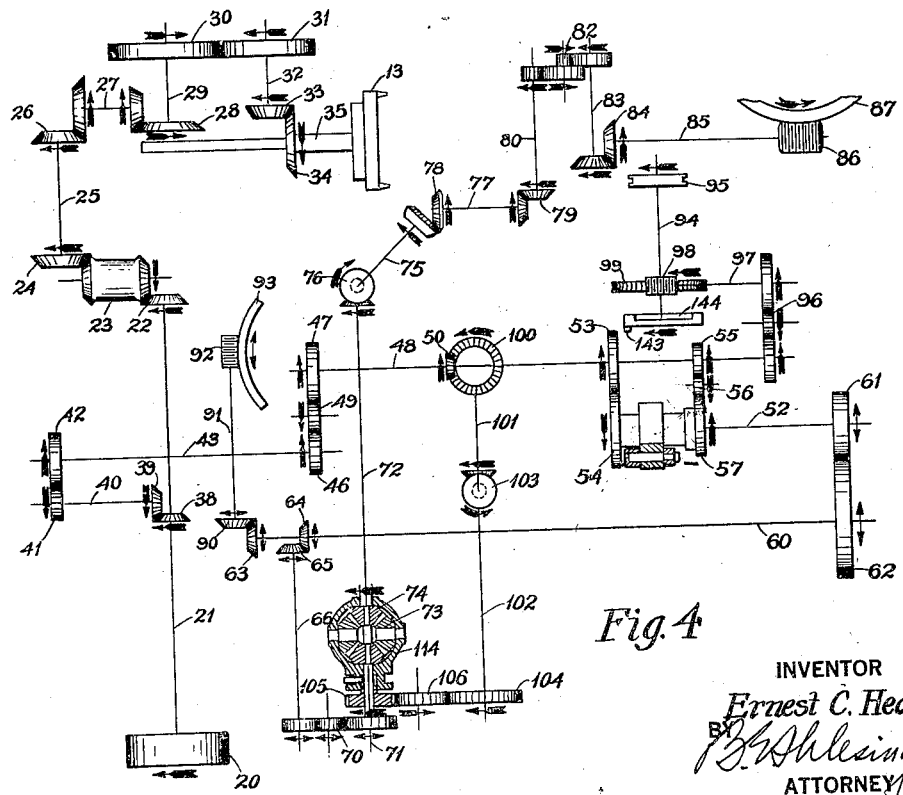
Figure 4 is a view showing diagrammatically the gearing arrangement of the machine.

The means for imparting to the tool its rotary movement may be of any desired character and has not been illustrated in the accompanying drawings save diagrammatically inasmuch as the tool drive forms no part of the present invention. In the machine shown, the tool is driven by the same mechanism as that employed in the machine described in the patent to Gleason et al., No. 1,203,608 issued November 7, 1916. This mechanism as shown diagrammatically in Figure 4 includes a pulley 20 driven from any suitable source of power and mounted upon a shaft 21 which drives the cutter 13 through the bevel gearing 22, the shaft 23, the bevel gearing 24, the shaft 25, the bevel gearing 26, the shaft 27, the bevel gearing 28, the shaft 29, the spur gears 30 and 31, the shaft 32, and the bevel gears 33 and 34, the latter gear being mounted on the spindle 35 to which the cutter 13 is secured.

Figure 2:
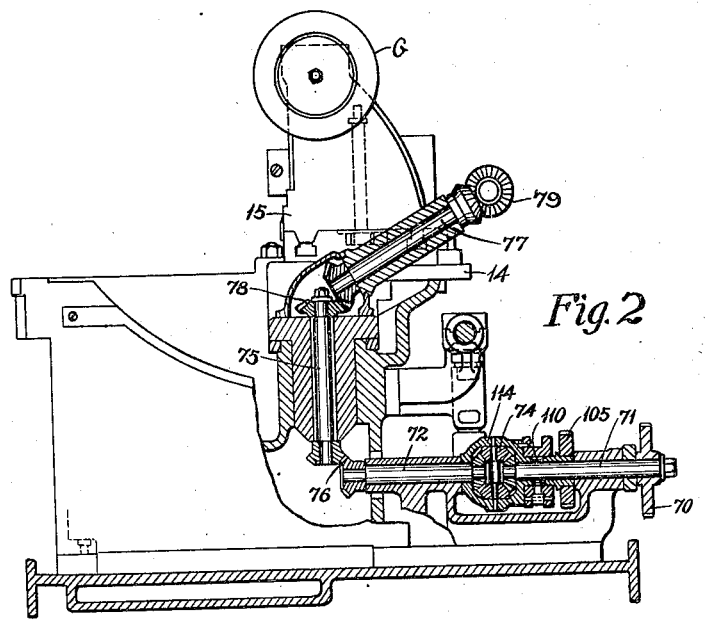
Figure 2 is a vertical section through the machine on the line 2—2 of Figure 1.

The means for imparting to the blank its rotary movement during cutting will be next described. Keyed to the shaft 21 (Figures 1 and 4) is a bevel gear 38 which meshes with a bevel gear 39 upon a shaft 40 which is journaled in the frame of the machine and which carries at its outer end a spur gear 41 which meshes with a spur gear 42 secured to the shaft 43 which is also journaled in the frame. Secured to the shaft 43 is an arm 45 (Figure 5) carrying a gear 46 which drives the gear 47 secured to the shaft 48 through the idler 49. The shaft 48 is journaled in the frame of the machine and has secured to it intermediate its ends a bevel pinion 50 which serves to actuate the indexing drive as will presently be explained. Journaled in the frame adjacent to the shaft 48 is a reversible shaft 52 which is adapted to be driven in opposite directions from the shaft 48 through any suitable type of reversing mechanism. This reversible type of reversing mechanism may be of any desired character. The embodiment shown is that illustrated and described in the patent to Gleason et al., No. 1,203,608, above mentioned, and reference may be had to that patent for a more detailed description of this mechanism. It is sufficient to say here that the shaft 52 may be driven from the shaft 48 through the gears 53 and 54 or through the gear 55, idler 56 and gear 57. The shaft 52 which may thus be driven in opposite directions is operatively connected with the shaft 60, also journaled in the frame of the machine, through a pair of gears 61 and 62. The shaft 60 carries two bevel gears one of which 63 serves to actuate the cradle drive as will presently be explained and the other of which 64 meshes with a gear 65 which is keyed to a shaft 66 which is journaled in the frame of the machine and which carries at its outer end one of a set of ratio change gears 70 which serve to transmit the rotation of the shaft 66 to the shaft 71 (Figure 2). The shaft 71 is operatively connected with an aligned shaft 72 by a differential 74, the function of which will be described more particularly hereinafter. Suffice it is to say here that during the cutting operation, the housing 114 of this differential is locked against rotation and the gears 73 of the differential serve merely to transmit rotation from the shaft 71 to the shaft 72. The shaft 72 drives the vertical shaft 75 through the bevel gearing 76 and the shaft 75 in turn drives the diagonal shaft 77 through the bevel gearing 78. The diagonal shaft 77 is connected by the bevel gearing 79 with the horizontal shaft 80 which is journaled on the work-head. Heretofore the index change gears have been placed in the idle train of gearing employed to intermittently impart to the blank spindle its indexing rotation and the blank spindle drive comprised simply those gears necessary to convey to it motion from the source of power and those gears required to maintain the proper ratio during cutting of the blank rotation and cradle movement. In a machine constructed according to my invention, however, the set of index change gears is incorporated in the continuously running blank drive and preferably at a point in the blank drive train nearest the blank spindle whereby the index change gears may act as one of the final reductions permitting speeding up of all the gears in the train preceding them and thus reducing the effect of any errors in these gears on the blank rotation. The worm shaft 85 is thus driven from the shaft 80 by the set of index change gears 82, the connecting shaft 83 and the bevel gears 84. The worm shaft 85 carries the worm 86 which meshes with and drives the worm wheel 87 which is keyed to the blank spindle 16.

The incorporation of the index change gears in the continuously running train as a final reduction results not only in more accurate indexing or tooth spacing, but in generating the tooth profiles more accurately also. The teeth of gears cut on a machine constructed according to this invention will have, therefore, not only more accurately spaced teeth but more correctly generated profiles.

The generation of the tooth profiles is, as previously stated, a result of the combined blank rotation and cradle movement. The cradle is operated from the shaft 60 through the bevel gear 63 (Figures 1 and 4) which meshes with a bevel gear 90 which is keyed to a shaft 91 which is journaled in the frame of the machine and carries a worm 92 which meshes with a worm wheel segment 93 which is secured to the cradle.

The blank and tool are withdrawn relatively to each other after each cutting operation has been completed, to permit of indexing the blank so as to present a new tooth portion thereof to the tool on reengagement of tool and blank. The means for effecting the relative withdrawal may be of any suitable character. The preferred construction is that described in the patent to Gleason et al. above cited and is illustrated diagrammatically in Figure 4. This preferred embodiment comprises a rotatable cam member 95 which is mounted upon a shaft 94 which is journaled in the frame of the machine and which is driven from the shaft 48 by the change gears 96, the shaft 97, the worm 98, and the worm wheel 99. The cam 95 engages with a roller (not shown) mounted on the blank head carrier. The cam 95 rotates always in the same direction and is of such form that periodically the blank is withdrawn relative to the tool.

During the period in which the tool is out of cutting position, an additional rotational movement is imparted to the blank spindle of such character that the blank rotation is accelerated or retarded relative to the cradle movement whereby the blank is indexed. The mechanism for imparting this indexing movement will now be described. Mounted on the shaft 48 intermediate its ends, as previously described is a bevel pinion 50 which meshes with a bevel gear 100 keyed to a shaft 101 which drives the shaft 102 through the bevel gearing 103. The shaft 102 carries at its outer end a spur gear 104 which rotates the spur gear 105 through the spur gear 106. This spur gear 105 is journaled on the shaft 71 and has secured to it a ratchet wheel 110 (Figures 2 and 7). The ratchet wheel 110 is adapted to be engaged by a pawl 111 which is pivotally mounted at 112 on a stop plate 113 which is secured to the housing 114 of the differential 73. The stop plate 113 is provided with a peripheral groove 115 and the pawl 111 is mounted between the two faces of the stop plate formed by this groove. Normally, that is, during the cutting operation upon the blank, the pawl is held retracted and out of engagement with the ratchet wheel. When the tool and blank have been withdrawn relatively to each other, however, the pawl is permitted to engage the ratchet wheel whereby the rotation of the gear 105, to which the ratchet wheel is secured, is transmitted to the differential housing 114, thereby imparting an added rotational movement to the blank, thus indexing the blank.

A coiled spring 116 which is secured at one end to the pawl 111 and at its other end to a pin 117 extending between the two faces of the stop plate (Figure 8) serves to urge the pawl constantly into engagement with the ratchet wheel. The pawl is held retracted, that is, out of engagement with the ratchet wheel during the cutting operation by means of a dog or detent 118 which engages a projection 119 on the tail of the pawl (Figure 9). The dog 118 is connected to or forms an integral part of a stop lever 120 which is pivotally mounted upon a stud 121 which is mounted in a bracket 122 secured to the base of the machine. This stop lever 120 engages a projection 123 on one face 124 of the stop plate 113, during the cutting operation, to prevent movement of the stop plate and the differential housing in one direction. Movement of the stop plate and differential housing in the opposite direction during the cutting operation is prevented by a second stop lever 125 which is also pivotally mounted on the stud 121 and which engages a lug or projection 126 formed on the other portion 127 of the stop plate. The projections 123 and 127, as shown, are formed by beveling off portions of the stop plate but may be of any other suitable construction.

In order to index, the stop levers 120 and 125 must be withdrawn from engagement with the differential housing and the pawl 111 must be released so that it will engage the ratchet wheel 110. The dog or detent 118, as previously stated, is preferably secured to or carried by the stop lever 120 so that when the stop lever 120 is retracted to release the stop plate, the detent 118 will simultaneously release the pawl. Preferably some means is provided also for connecting the two stop levers 120 and 125 together so that they will be retracted from engagement with the stop plate and moved into engaging position simultaneously. In the embodiment of the invention shown, the means for retracting the stop levers together, comprises a lug 129 which is secured to the stop lever 120 and which engages a projection 130 on the stop lever 125 whereby when one or the other stop lever is withdrawn from locking position the other is withdrawn also. A spring pressed plunger 131 housed in the bracket 122 and pressing against both the stop levers 120 and 125 serves to urge these levers constantly into locking position.

The withdrawal of the stop levers is effected by movement of a bell crank lever 135 (Figs. 1, 6 and 7) which is pivoted on a pin 140 carried by the bracket 142 which is secured to the frame of the machine. This bell crank lever 135 has a projection 137 on one end engaging a screw 138 carried by the stop lever 120 and carries a roller 139 on its other end which is adapted to be engaged by a projection 143 carried by a rotary plate 144. The plate 144 may be secured to the cam 95 or mounted as a separate part upon the cam shaft 94. The plate 144 always rotates in the same direction so that periodically the projection 143 engages the roller 139 and rocks the bell crank lever 135 about its pivot 140, thereby disengaging the stop lever 120 from engagement with the stop plate 114 and at the same time releasing the pawl 111 and disengaging the stop lever 125. As soon as the stop levers 120 and 125 have been withdrawn from locking position and the pawl 111 has engaged the ratchet wheel 110 the motion of the ratchet wheel, which is continuously running is transmitted to the differential housing 114 whereby the rotation of the blank relative to the cradle movement is accelerated or retarded and the blank is indexed. In the machine described, the cradle movement and the blank drive is reversed through the reversing mechanism when a cutting operation has been completed.

The indexing operation takes place during one complete rotation of the stop plate 113 and the differential housing 114, the stop levers 120 and 125 riding on the periphery of the parts 124 and 127 of the stop plate after retraction and returning to locking position under impulse of the spring plunger 131 after the stop plate has made one complete rotation. The return of the stop lever 120 to locking position causes the dog 118 to reengage the projection 119 on the pawl 111 and gage the pawl from engagement with the ratchet wheel 110. By the means described, the differential housing is always locked up in the same position after each indexing operation and any error which might occur in the gears of the differential or the gears actuating the same is thus transmitted equally to each tooth with the consequence that such errors in no wise affect the indexing or tooth spacing. Preferably the members of the gear train which are interposed between the differential and the index change gears 82 are all miter gears so that each one of the gears in the construction described will go through the same cycle in each indexing operation and consequently any errors in these gears will not affect indexing. These features combined with the acceleration of the drive attained by employing the index change gears as a final reduction makes possible a highly improved product.

While the present invention has been described particularly with reference to a machine for producing curved tooth gears it will be understood that it is applicable also to the production of straight tooth gears. The improvement constituting this invention may be used on machines for producing hypoid gears as well as bevel gears and on machines for producing other types of gears also. It may be used in any operation upon such gears whether cutting, grinding, lapping or burnishing and it will be understood that the term "cutting" is intended to cover any one of these operations.

In general, it may be said, that, while I have described a preferred embodiment of my invention, the invention is capable of further modification within its limits and the scope of the appended claims, and that this application is intended to cover any variations, uses, or adaptations of the invention following, in general, the principles of the invention and including such departures from the present disclosure as come within known or customary practice in the gear art and may be applied to the essential features hereinbefore set forth and as fall within the scope of the appended claims.

Having thus described my invention, what I claim is:

1. In a machine for generating gears, a blank support and a tool support, a movable carrier upon which one of said supports is mounted, means for imparting movement to said carrier, a blank spindle rotatably mounted on the blank support, a drive shaft, a train of gearing operatively and directly connecting said drive shaft and blank spindle and including a set of gears governing the number of teeth to be cut in the blank, a set of change gears, for maintaining the proper relation of blank and carrier movements during cutting, operatively connected with said train of gearing, means for rotating said drive shaft during cutting and indexing and means for periodically imparting to said train of gearing an added algebraic rotation to index the blank.

2. In a machine for generating gears, a blank support and a tool support, a blank spindle rotatably mounted on the blank support, a drive shaft, a train of gearing operatively and directly connecting said drive shaft and blank spindle and including a set of change gears governing the number of teeth to be cut in the blank, reversible means for rotating said drive shaft, a movable carrier upon which one of said supports is mounted, means for imparting movement to said carrier in predetermined relation to the blank rotation, a movable member operatively connected with said train of gearing, a continuously rotating member, means for locking the first member against movement during cutting, means for periodically releasing said locking means and simultaneously connecting said two members together to periodically impart to said train of gearing an additional algebraic rotational movement and means controlling the last named means to allow said connection during a predetermined integral number of revolutions of said continuously rotating member.

3. In a machine for generating gears, a blank support and a tool support, a movable cradle upon which one of said supports is mounted, a blank spindle rotatably mounted on the blank support, a drive shaft, gearing operatively connecting said drive shaft and blank spindle and including a set of differential gears, means for locking one element of said differential against rotation during cutting, means for releasing said element when each cutting operation is completed, means for imparting to said element when released a predetermined integral number of turns whereby an added algebraic movement is imparted to the blank spindle to index the blank and the differential element is always locked up in the same place.

4. In a machine for generating gears, a blank support and a tool support, a movable cradle upon which one of said supports is mounted, a blank spindle rotatably mounted on the blank support, a drive shaft, gearing operatively connecting said drive shaft and blank spindle and including a set of differential gears and a set of change gears for maintaining the proper ratio of cradle and blank movements during cutting, means for locking one element of said differential against rotation during cutting, means for releasing said element when each cutting operation is completed and means for imparting to said element when released a predetermind integral number of turns whereby an added algebraic movement is imparted to the blank spindle periodically to index the blank and the differential element is always locked up in the same place.

5. In a machine for generating gears, a blank support and a tool support, a movable cradle upon which one of said supports is mounted, a blank spindle rotatably mounted on the blank support, a drive shaft, gearing operatively connecting said drive shaft and blank spindle and including a set of differential gears, means for locking one element of said differential against rotation during cutting, a continuously driven member, means for periodically releasing said locking means and for simultaneously connecting said continuously driven member with said differential element, and means for controlling the releasing means so that the differential element will always make an integral number of revolutions during the period of its connection with said continuously driven member.

6. In a machine for generating gears, a blank support and a tool support, a movable carrier upon which one of said supports is mounted, means for imparting movement to said carrier, a blank spindle rotatably mounted on the blank support, a drive shaft, a train of gearing operatively and directly connecting said drive shaft and blank spindle and including a set of change gears governing the number of teeth to be cut in the blank, a differential incorporated in said train and operatively interposed between said drive shaft and said set of change gears, means for locking one element of said differential against rotation during cutting, means for periodically withdrawing said locking means from locking position and means for imparting to said element of the differential a rotary movement when released whereby an added algebraic movement is imparted to the blank spindle and the blank indexed.

7. In a machine for generating gears, a blank support and a tool support a movable carrier upon which one of said supports is mounted, means for imparting movement to said carrier, a blank spindle rotatably mounted on the blank support, a drive shaft, a train of gearing operatively and continuously connecting said drive shaft and blank spindle and including a set of change gears governing the number of teeth to be cut in the blank, a differential incorporated in said train and operatively interposed between said drive shaft and said set of change gears, means for locking one element of said differential against rotation during cutting, means for periodically withdrawing said locking means from locking position, and means for imparting to said element of the differential when released a predetermined integral number of revolutions whereby an added algebraic movement is imparted to the blank spindle periodically to index the blank and the differential element is always locked up in the same place.

8. In a machine for generating gears, a blank support and a tool support, a movable cradle upon which one of said supports is mounted, a drive shaft, gearing connecting said drive shaft and cradle, a blank spindle rotatably mounted on the blank support, a train of gearing operatively and directly connecting said drive shaft and blank spindle and including a set of change gears governing the number of teeth to be cut in the blank, reversible means for rotating said drive shaft, a differential incorporated in said train and operatively interposed between said drive shaft and said set of change gears, means for locking one element of said differential against rotation during cutting, means for periodically withdrawing said locking means from locking position and means for imparting to said element of the differential a rotary movement when released whereby an added algebraic rotation is imparted to the blank spindle and the blank indexed.

9. In a machine for generating gears, a blank support and a tool support, a cradle upon which one of said supports is mounted, a drive shaft, gearing connecting said drive shaft and cradle, a blank spindle rotatably mounted on the blank support, a train of gearing operatively and directly connecting said drive shaft and blank spindle and including a set of change gears governing the number of teeth to be cut in the blank, reversible means for rotating said drive shaft, a differential incorporated in said train and operatively interposed between said drive shaft and said set of change gears, means for locking said set of change gears, means for locking one element of said differential against rotation during cutting, means for periodically disengaging said locking means and means for imparting to said differential element when released an integral number of revolutions.

10. In a machine for generating gears, a blank support, and a tool support, a cradle upon which one of said supports is mounted, a drive shaft, gearing connecting said drive shaft and cradle, a blank spindle rotatably mounted on the blank support, a train of gearing operatively and directly connecting said drive shaft and blank spindle and including a set of change gears governing the number of teeth to be cut in the blank, reversible means for rotating said drive shaft, a differential incorporated in said train and operatively interposed between said drive shaft and said set of change gears, means for locking one element of said differential against rotation during cutting, a continuously rotating member, means for periodically releasing said locking means and simultaneously connecting said continuously driven member with said differential element, whereby the blank is periodically indexed and the differential element always locked up in the same place.

11. In a machine for generating gears, a blank support and a tool support, a cradle upon which one of said supports is mounted, a drive shaft, gearing connecting said drive shaft and cradle, a blank spindle rotatably mounted on a blank support, a train of gearing operatively and directly connecting said drive shaft and blank spindle and including a set of change gears governing the number of teeth to be cut in the blank, a reversible means for rotating said drive shaft, a differential incorporated in said train and interposed between said drive shaft and said set of change gears, means for locking one element of said differential against rotation during cutting, a continuously rotating member, means for periodically releasing said locking means and simultaneously connecting said continuously driven member with said differential element, and means controlling the releasing means so that the differential element always makes an integral number of revolutions during the period of its connection with the continuously rotating member.

12. In a machine for producing gears, a blank support and a tool support, a cradle upon which one of said supports is mounted, a blank spindle rotatably mounted on the blank support, a set of change gears governing the number of teeth to be cut in the blank operatively connected with the blank spindle, a drive shaft, reversible means for rotating said drive shaft, a differential operatively connected with said drive shaft and said set of change gears, means for locking one element of said differential against rotation during cutting, a gear, means continuously rotating said gear, a ratchet and pawl mechanism, one member of which is connected to said gear and the other member of which is connected to the normally locked element of the differential, means constantly urging said pawl into engagement with said ratchet wheel, means withholding said pawl from engagement with said ratchet wheel during cutting, means for releasing said differential element after each cutting operation, and means for simultaneously releasing said pawl to permit connection of the continuously rotating gear with said differential element whereby the blank may be periodically indexed.

13. In a machine for producing gears, a blank support and a tool support, a cradle upon which one of said supports is mounted, a blank spindle rotatably mounted on the blank support, a set of change gears governing the number of teeth to be cut in the blank operatively connected with the blank spindle, a drive shaft, reversible means for rotating said drive shaft, a differential operatively connected with said set of change gears, means for locking one element of said differential against rotation during cutting, a gear, means for continuously rotating said gear, a ratchet and pawl mechanism, one member of which is connected to said gear and the other member of which is connected to a normally locked element of the differential, means constantly urging said pawl into engagement with said ratchet wheel, means withholding said pawl from engagement with said ratchet wheel during cutting, means for releasing said differential element after each cutting operation, and means connected thereto for simultaneously releasing said pawl to permit connection of the continuously running gear with said differential element, and means controlling said releasing means so that the differential locking means is held out of engagement with said differential element during a predetermined integral number of rotations of said differential element.

14. In a machine for generating gears, a blank support and a tool support, a cradle upon which one of said supports is mounted, a blank spindle journaled in blank support, a train of gearing connecting said cradle and blank spindle and including a set of differential gears, a set of change gears governing the number of teeth to be cut in the blank incorporated in said train and interposed between said differential and the blank spindle, a set of change gears for maintaining the proper ratio of cradle and blank movements during cutting incorporated in said train and interposed between said differential and said cradle, reversible means for rotating said gear train, means for locking one element of said differential against rotation during cutting, means for periodically withdrawing said locking means from locking position and means for imparting to said element of the differential a rotary movement when released whereby an added algebraic rotation is periodically imparted to the blank spindle and the blank indexed.

15. In a machine for generating gears, a blank support and a tool support, a cradle upon which one of said supports is mounted, a blank spindle journaled in a blank support, a train of gearing connecting said cradle and blank spindle and including a set of differential gears, a set of change gears governing the number of teeth to be cut in the blank incorporated in said train and interposed between said differential and the blank spindle, a set of change gears for maintaining the proper ratio of cradle and blank movements during cutting incorporated in said train and interposed between said differential and said cradle, reversible means for rotating said gear train, means for locking one element of said differential against rotation during cutting, means for periodically withdrawing said locking means from locking position and means for imparting to said element of the differential when released an integral number of revolutions.

16. In a machine for generating gears, a blank support, a tool support, a blank spindle rotatably mounted on said blank support, a movable carrier upon which one of said supports is mounted, a train of gearing for rotating said blank spindle including a set of change gears governing the number of teeth to be cut on the blank, means for imparting movement to said carrier in predetermined relation to the blank rotation, means for rotating said train of gearing to rotate the blank spindle during cutting and means for periodically imparting to said set of change gears an added algebraic rotation to index the blank.

17. In a machine for generating gears, a blank support, a tool support, a cradle upon which one of said supports is mounted, a drive shaft, gearing connecting said drive shaft and cradle, a blank spindle rotatably mounted on the blank support, a train of gearing operatively and directly connecting said drive shaft and blank spindle and including a set of change gears governing the number of teeth to be cut in the blank, reversible means continuously operative for rotating said drive shaft, and means for periodically imparting to the train of gearing an added algebraic rotation to index the blank.

18. In a machine for generating gears, a blank support, a tool support, a blank spindle rotatably mounted on the blank support, a drive shaft, means for continuously rotating said drive shaft, a train of gearing operatively and directly connecting said drive shaft and blank spindle and including a set of change gears governing the number of teeth to be cut in the blank, reversible means for rotating said drive shaft, a movable carrier upon which one of said supports is mounted, means for imparting movement to said carrier in predetermined relation to the blank rotation, a movable member operatively connected with said train of gearing, means for locking said member against rotation during cutting, means for periodically releasing said member, and means for imparting movement to said member when released whereby an added rotary movement is periodically imparted to said train of gears to index the blank.

ERNEST C. HEAD